United States Patent [19]

Ohhashi

[11] Patent Number: 4,845,626

[45] Date of Patent: Jul. 4, 1989

[54] STEREOSCOPIC IMAGE DISPLAY APPARATUS

[75] Inventor: Akinami Ohhashi, Saitama, Japan

[73] Assignee: Kabushiki Kaisha Toshiba, Kawasaki, Japan

[21] Appl. No.: 174,981

[22] Filed: Mar. 29, 1988

[30] Foreign Application Priority Data

Apr. 3, 1987 [JP] Japan .................................. 62-81091

[51] Int. Cl.[4] ...................... G06F 15/42; G06F 15/72; A61B 6/03
[52] U.S. Cl. .................................. 364/413.16; 378/4; 378/41
[58] Field of Search .................. 364/413.16; 378/4, 41

[56] References Cited

U.S. PATENT DOCUMENTS 4,672,649  6/1987  Rutt ........................................ 378/10

Primary Examiner—Clark A. Jablon
Attorney, Agent, or Firm—Finnegan, Henderson, Farabow, Garrett, & Dunner

[57] ABSTRACT

A stereoscopic image display apparatus comprises a CT scanner, a data processing device, and a stereoscopic image display device. The data processing device processes projection data obtained from the CT scanner to remove data corresponding to portions unnecessary for stereoscopic display. Specifically, the data processing device forms a sinogram which represents the level of projection data for each portion as the locus of brightness with the ordinates denoting projection angles and the abscissas denoting detecting positions. In the projection angles from 0° through 360°, the projection data obtained at the detecting positions from 1 to a predetermined number is removed from the locus of that detecting position so that the loci of outside portions of a circle of a predetermined radius corresponding to a predetermined detecting position are removed. On the basis of projection data having data for unwanted portions removed, the display device performs the stereoscopically visible display using a stereoscopic display method using projection images.

10 Claims, 8 Drawing Sheets

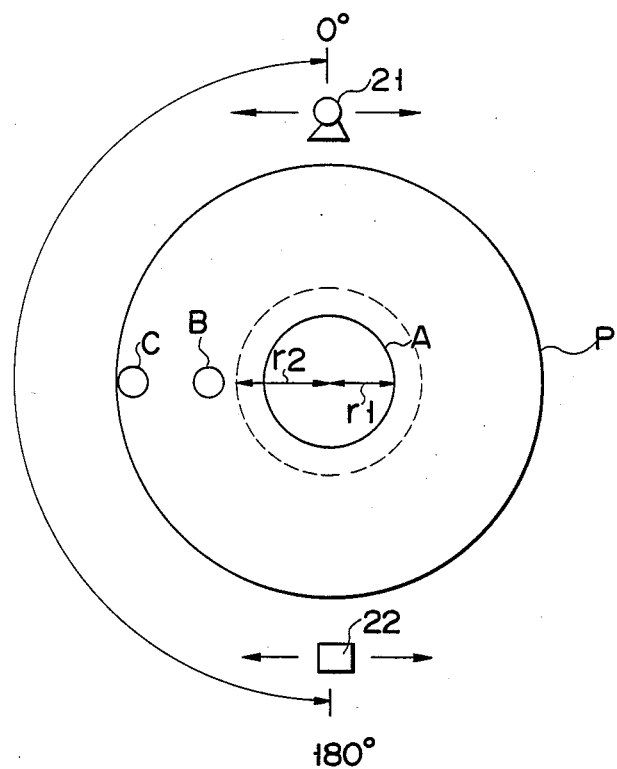
FIG. 2
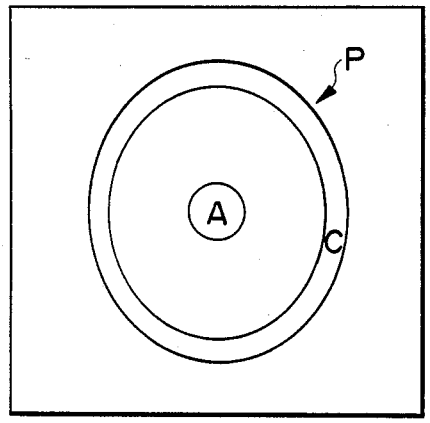 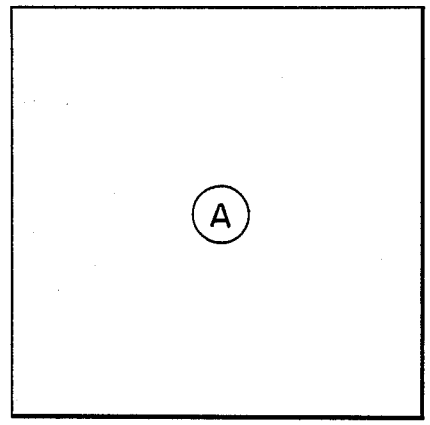
FIG. 6  FIG. 7

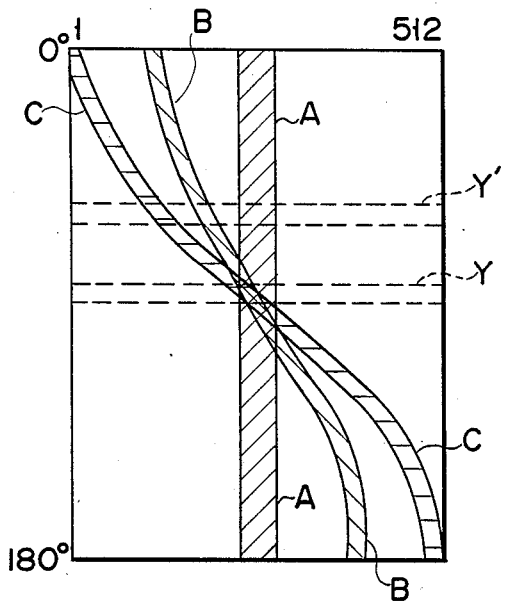
F I G. 3
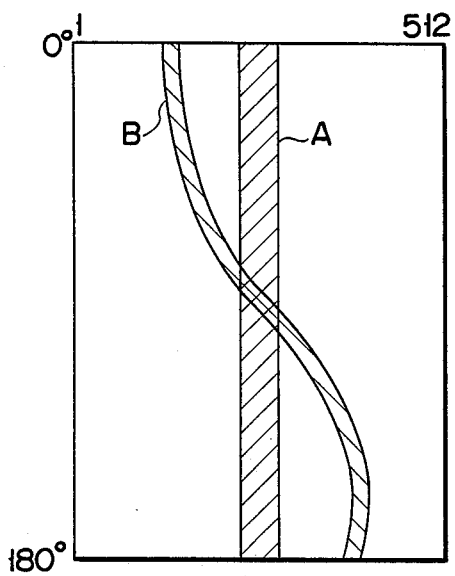
F I G. 4
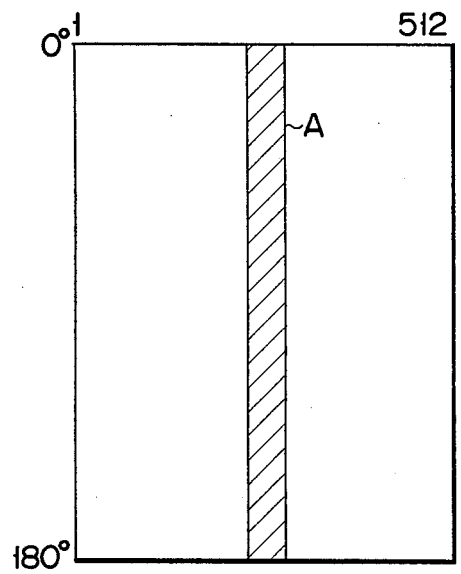
F I G. 5

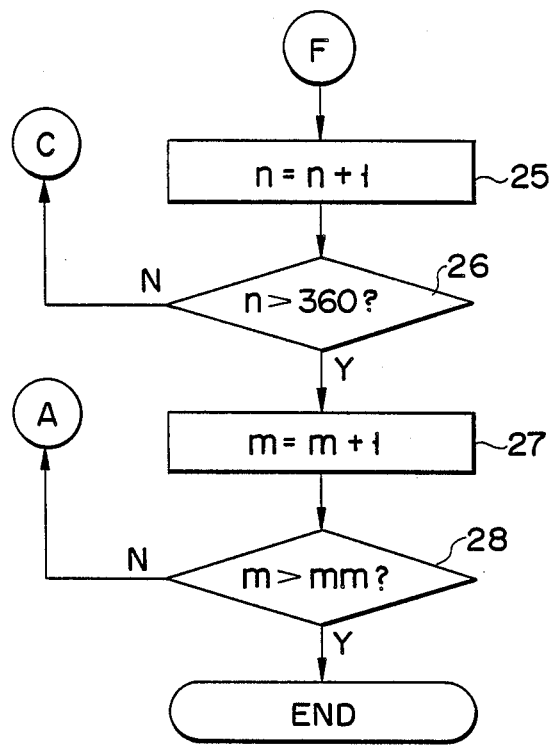
F I G. 10D

STEREOSCOPIC IMAGE DISPLAY APPARATUS

BACKGROUND OF THE INVENTION

1. Field of the Invention

This invention relates to a stereoscopic image display apparatus for three-dimensional (stereoscopic) presentation of an object under examination by processing two-dimensional image information of plural slices of the object, obtained from a computerized tomography (CT) scanner.

2. Description of the Related Art

Conventional known methods used to display stereoscopic images include the section conversion method, the surface display method, the multiframe display method, the stereoscopic display method using projection images, and so forth. The optimum method chosen from among these varies according to the nature of the object under examination.

The stereoscopic display method using projection images uses projection information at two projection angles among some items of projection information obtained by a CT scanner so as to form display information for stereoscopic vision.

However, when the stereoscopic method is used for scanning a portion of a human body, such as the head, which is surrounded by a substance, i.e. bone, having a high X-ray absorption factor, internal tissue, such as the patient's brain, cannot be observed.

SUMMARY OF THE INVENTION

It is an object of this invention to provide a stereoscopic display apparatus for enabling stereoscopic vision by the use of sectional image information, pertaining to plural slices of an object, from which unwanted information has been removed.

A stereoscopic image display apparatus according to this invention comprises a memory for collecting, from a CT scanner, projection data pertaining to a plurality of slices of an object; a data processor for subtracting predetermined projection data from data of every predetermined projection angles, among all data collected by the CT scanner and subtracting data other than data of the portion including the center of the slice by changing the predetermined projection data sequentially from the outermost projection data toward an inner data; and a display for performing a stereoscopically visible display on the basis of the outputs of the data processor for a plurality of slices.

BRIEF DESCRIPTION OF THE DRAWINGS

FIG. 2 shows a cross section of an object under examination, and which is useful in explaining the principle of this invention;

FIG. 3 shows a sinogram obtained when the object is scanned by a CT scanner;

FIG. 4 shows a sinogram obtained by removing the locus of the outermost portion of the object from the sinogram of FIG. 3;

FIG. 5 shows a sinogram obtained by removing the locus of the next outermost portion of the object from the sinogram of FIG. 4;

FIG. 6 is a cross-sectional view of a head of the human, and which represents the effect of this invention;

FIG. 7 is a cross-sectional view of the head in which the image of the outside bone is removed from the head image shown in FIG. 6;

FIGS. 10A through 10D are flowcharts for explaining the operation of the embodiment.

DETAILED DESCRIPTION OF THE PREFERRED EMBODIMENT

Figure 1:
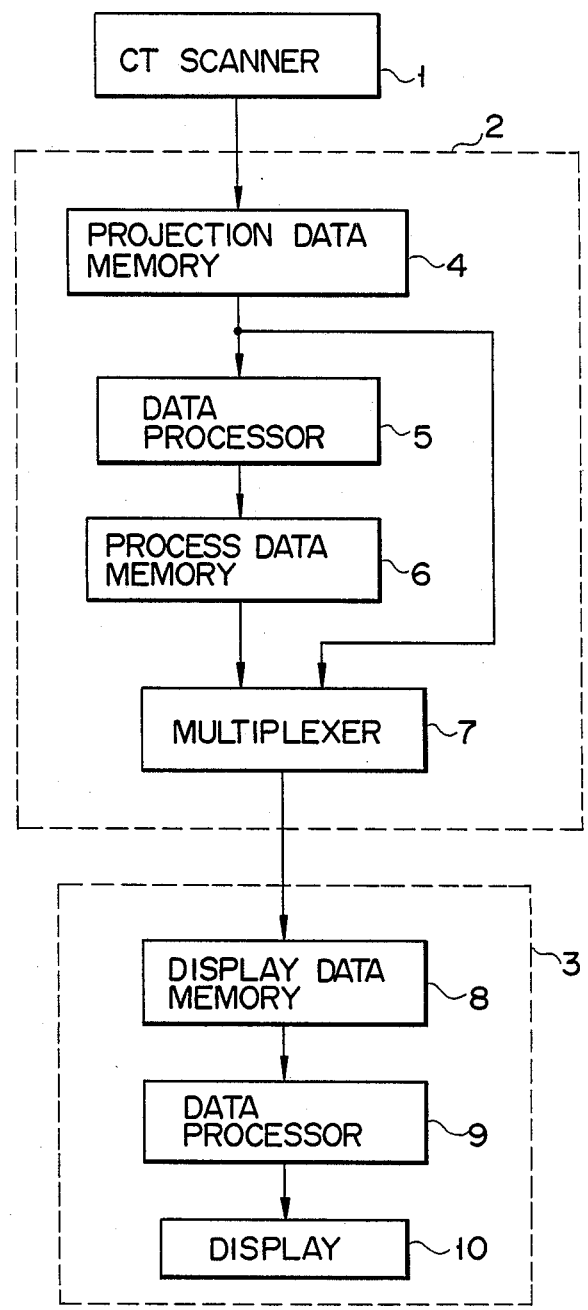
FIG. 1 is a block diagram of a stereoscopic display apparatus embodying this invention.

Referring now to FIG. 1, a stereoscopic display apparatus embodying this invention broadly comprises a CT scanner 1, a data processing device 2, and a stereoscopic image display device 3. Data processing device 2 processes projection data obtained by CT scanner 1 and removes data representing portions unnecessary for stereoscopic vision. Stereoscopic image display device 3 is responsive to the processed data from data processing device 2 to display a stereoscopically visible image.

Data processing device 2 comprises a projection data memory 4 for storing projection data (original data) collected by CT scanner 1, data processor 5 for fetching in sequence the data stored in memory 4 and removing, from the fetched data, data unnecessary for stereoscopic display, a process data memory 6 for storing processed data supplied thereto by data processor 5, and a multiplexer 7 for selectively transferring the projection data from projection data memory 4 and the processed data from processed-data memory 6 to stereoscopic display device 3.

Stereoscopic display device 3 comprises a display data memory 8 for storing the data transferred thereto by multiplexer 7, a data processor 9 for processing the display data on the basis of a stereoscopic vision-enabling displaying method such as sectional conversion method, surface display method, multiframe display method, or stereoscopic display method depending on projection data, and a display 10 for displaying an image in a stereoscopically visible manner.

The principle of the present invention will now be described, with reference to FIGS. 2 through 5.

FIG. 2 shows, by way of example, a section of an object to be scanned by CT scanner 1. There are two types of CT scanners; one uses parallel beams and the other uses a fan beam. Both types of CT scanners are applicable to this invention. To simplify the description, FIG. 2 will be explained in terms of the parallel beams.

As is shown in FIG. 2, an X-ray tube 21 and an X-ray detector 22 are arranged such that they face each other, an object P being interposed therebetween. X-ray tube 21 and detector 22 move in parallel to each other, in the same direction, to irradiate object P with parallel beams. A total of 512 parallel beams are irradiated onto the object as X-ray tube 21 and detector 22 move together in parallel; 512 being the number of detecting positions along which X-ray tube 21 and detector 22 move together, at each of which the X-ray tube emits a pencil beam of X-rays toward the object, the detector detecting the pencil beam transmitted therethrough. X-ray tube 21 and detector 22 are rotated together about the object, through an angle of 180° degrees or 360° degrees. In lieu of a single detector 22, 512 detectors be arranged, one at each of the detecting positions.

If the fan beam is used, the parallel beams are replaced by a plurality of beam paths which are obtained by equally dividing the shape (section) of the fan beam. It is supposed that object P has a portion A existing at the center thereof, a portion B existing on the outside of portion A, and a portion C existing on the outermost side of the object, with portions A, B, and C aligned with the center of the object as shown.

FIG. 3 shows projection information obtained by rotating X-ray tube 21 about the object from 0° to 180°. The projection information as shown in FIG. 3 is called a sinogram which indicates a detected value (projection data) at each detecting position in terms of brightness with the abscissas thereof denoting the detecting positions of 1 to 512 and the ordinates denoting the projection angles of 0° to 180°. Projection data memory 4 stores projection data as digital data. The sinogram indicates the digital values of projection data in terms of brightness. The density of each locus of the sinogram indicates the brightness.

Since portion A within object P exists at the rotational center of the CT scanner it is always detected at the central detecting position over the projection angles from 0° to 180°. Thus, portion A is represented in the sinogram as a vertically straight locus passing through the center. Portion C is detected at the leftmost detecting position (detecting position 1) when the position angle is 0°. As the projection angle increases the detected position of portion C gradually approaches the center. At 180° portion C is detected the rightmost detecting position (detecting position 512). Consequently, portion C forms a curved locus which moves from the left to the right as the projection angle increases. It will be evident that since portion B exists between portions A and C it forms a locus between the loci of portions A and C.

The sinogram represents projection data of a slice of the object. Thus, projection data of many slices is needed to display a stereoscopic image. As one-slice projection data use is made of a data part obtained at a predetermined projection angle shown by dashed lines in FIG. 3, for example, the data part Y. With the stereoscopic display method using human eyes' palallax, however, different data parts Y and Y' should be used.

The data part Y contains superimposed projection data for different portions. Where the portion A is a region which is practically desired for stereoscopic vision, and the portion C is a bone the portion C is higher than the portion A in CT value. Thus, if an attempt is made to display a stereoscopic image on the basis of the projection data of part Y, then the image of portion A would be covered with the image of portion C. Consequently, the portion A can hardly be seen. However, in the data part for a projection angle of approximately 0°, the portions A, B, and C are separated from one another. In particular, where the object P is head, the internal substance A is surrounded with bone C and thus can hardly be seen by stereoscopic display.

Thus, the feature of the present invention consists in removing data for unwanted portions from the projection data (sinogram) by the use of the following techniques.

The portion C in FIG. 2, which exists on the outermost side of the circular object P and on the horizontal center line thereof, is detected by the detector positioned at the detecting position 1 when the projection angle is 0°. If the portion C is regarded as a minute point, then the projection data (detected data) detected at the detecting position 1 when the projection angle is 0° includes data for portion C only. Accordingly, the locus of portion C can be removed from the sinogram by subtracting the detected data for the projection angle 0° and the detecting position 1 from the locus of the detecting position 1, i.e., the locus of portion C.

In the above description it is supposed that the outermost portion C exists on the side of detecting position 1. The portion C may exist on the side of the detecting position 512 on the horizontal center line as well. Thus, the projection data for the projection angle 0° and the detecting position 512 is also subtracted from the locus of the detecting position 512 so that the loci of the outermost portions on the horizontal center line are removed from the sinogram.

The sinogram subjected to the subtraction processing is shown in FIG. 4. As shown the locus of the portion C has been removed.

The outermost portion C may exist not only on the horizontal center line but also at other angles. Thus, the projection data obtained at the detecting positions 1 and 512 while the projection angle is changed from 0° to 180° is subtracted from the loci of the detecting positions 1 and 512. Consequently, the projection data detected at detecting positions 1 and 512 for substances existing on the outermost circumference can be removed.

In the same way as the above, the projection data obtained at detecting positions 2, 511; 3, 510; 4, 509; and so on while the projection angle changes from 0° to 180° are sequentially subtracted from all the loci of the detecting positions with the result that data for portions existing on concentric circles is removed in the sequence from the outer circle to the inner circle. If this processing is continued up to the detecting position corresponding to a circle of radius of r2, then the data for portion B will also be removed in the example of FIG. 2. The resultant sinogram will contain the locus of portion A only as shown in FIG. 5. Where a head as shown in FIG. 6 is examined, the reconstruction processing based on the sinograph shown in FIG. 5 will result in a tomogram image as shown in FIG. 7 having the surrounding head bone C removed.

The above description is intended to display a stereoscopic image of a cylindrical shape of radius of r2 from the center of the object. However, the above principle may be applied to stereoscopic presentation of a desired shape. For example, if the projection data for a region extending up to radius r2 in FIG. 2 and the projection data for a region up to radius r1 are extracted, then the subtraction of the latter from the former will enable the stereoscopic presentation of a hollow cylinder between r2 and r1. Further, where the detected data for a region other than the region having a predetermined opening angle is removed from all the detecting positions in the removing processing, a stereoscopic image of a sector cylinder shape having the opening angle will be obtained. In the similar way, by selecting the radius and the angle appropriately a circular-arc cylinder stereoscopic image will be obtained.

The practical operations of this embodiment will be described hereinafter.

Table 1 shows the projection data in two-dimensional matrix form.

TABLE 1

| $D_{1,1}$ | $D_{1,2}$ | $D_{1,3}$ | ... | $D_{1,512}$ |

TABLE 1-continued

| $D_{2,1}$ | $D_{2,2}$ | $D_{2,3}$ | ... | $D_{2,512}$ |
|---|---|---|---|---|
| $D_{3,1}$ | $D_{3,2}$ | $D_{3,3}$ | ... | $D_{3,512}$ |
| . | . | . | | . |
| . | . | . | | . |
| . | . | . | | . |
| $D_{359,1}$ | $D_{359,2}$ | $D_{359,3}$ | ... | $D_{359,512}$ |
| $D_{360,1}$ | $D_{360,2}$ | $D_{360,3}$ | ... | $D_{360,512}$ |

In the above table projection data $D_{n,m}$ stands for the projection data obtained in the n-th projection and at the m-th detecting position with the n changed from 1° to 360° in angular steps of 1°, and the m changing from 1 to 512 in increments of 1. Since the address of projection data memory 4 is one-dimensional the address AD of memory 4 in which projection data $D_{n,m}$ is stored is given by $$AD = (n-1) \times 512 + m \quad (1)$$

Figure 8:
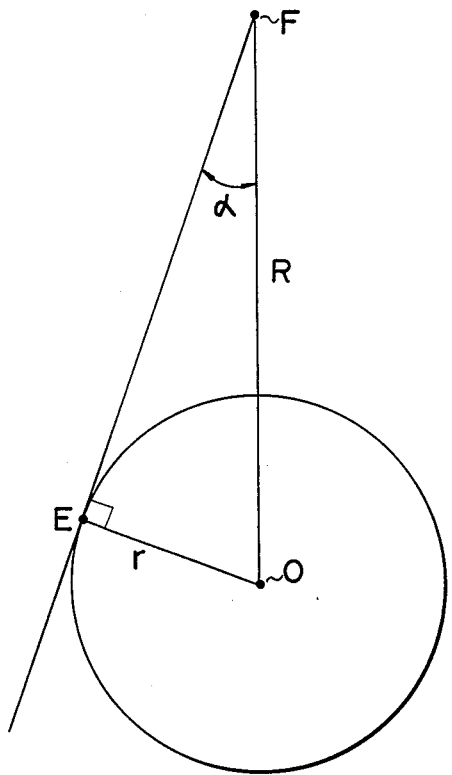
FIG. 8 shows a geometrical positional relationship between an X-ray tube and portions of the object on a circumference of a section with a predetermined radius, and which represents the principle of the embodiment.

It is supposed that table 1 shows projection data obtained by the use of a fan beam as shown in FIG. 8 unlike the description in connection of FIG. 2. In FIG. 8, R stands for a distance between the rotational center (the center of the object) O and the focus F of the X-ray tube 21. Supposing that an angle formed by adjacent beam paths (an angle formed by two paths connecting the focus F of X-ray tube 21 to two adjacent detecting positions) is a, the angle $\alpha_1$ between the beam path connecting the detecting position 1 to the focus F and the beam path connecting the center O to the focus F will be expressed with counterclockwise direction taken as positive as follows:

$$\alpha_1 = -(512/2 - 0.5) \times a \quad (2)$$

In general, angle $\alpha_m$ between the beam path connecting the m-th detecting position to the focus F and the beam path connecting the center O to the focus F is given by $$\alpha_m = (m - 257 + 0.5) \times a \quad (3)$$

Figure 9:
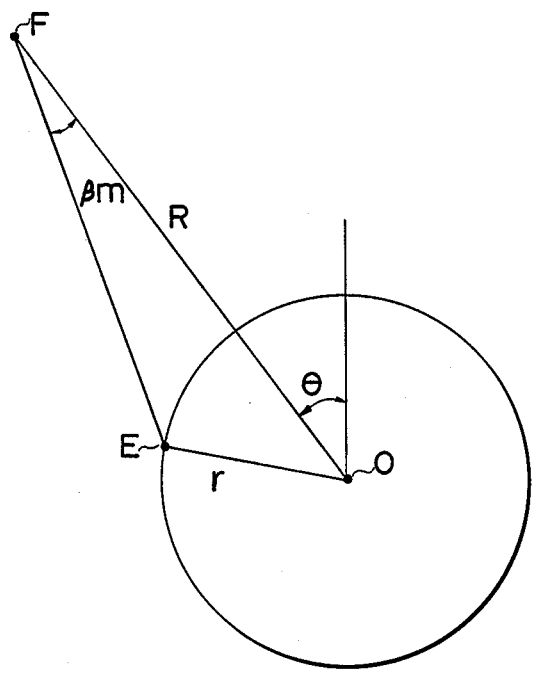
FIG. 9 shows a geometrical positional relationship similar to that of FIG. 8, which is obtained by rotating the X-ray tube through a predetermined angle.
Figure 10A:
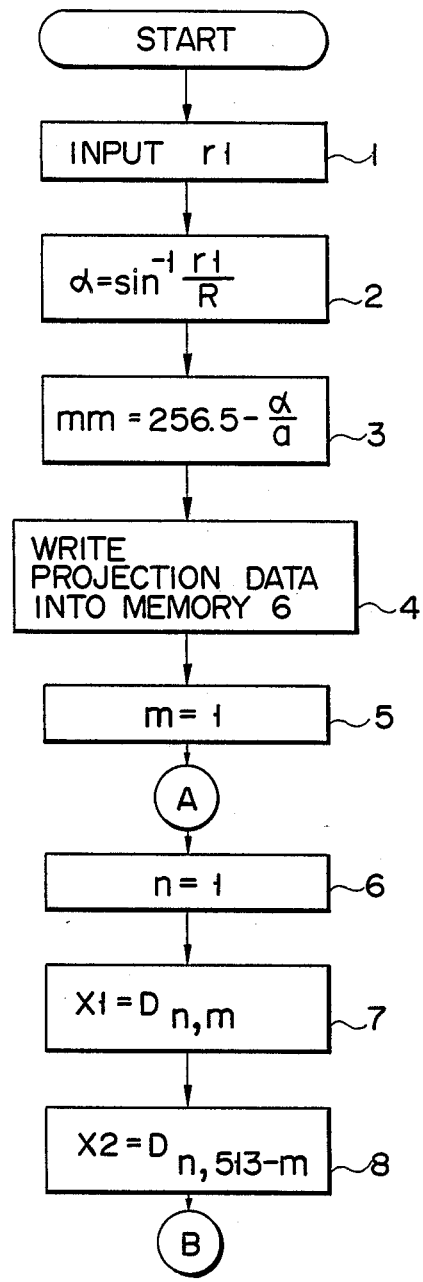
Figure 10B:
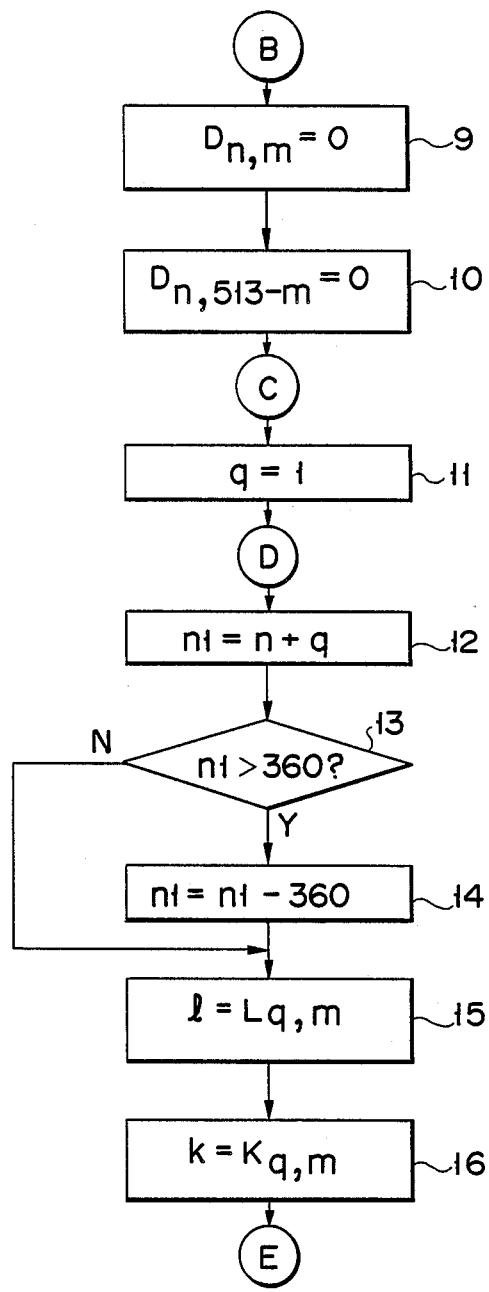
Figure 10C:
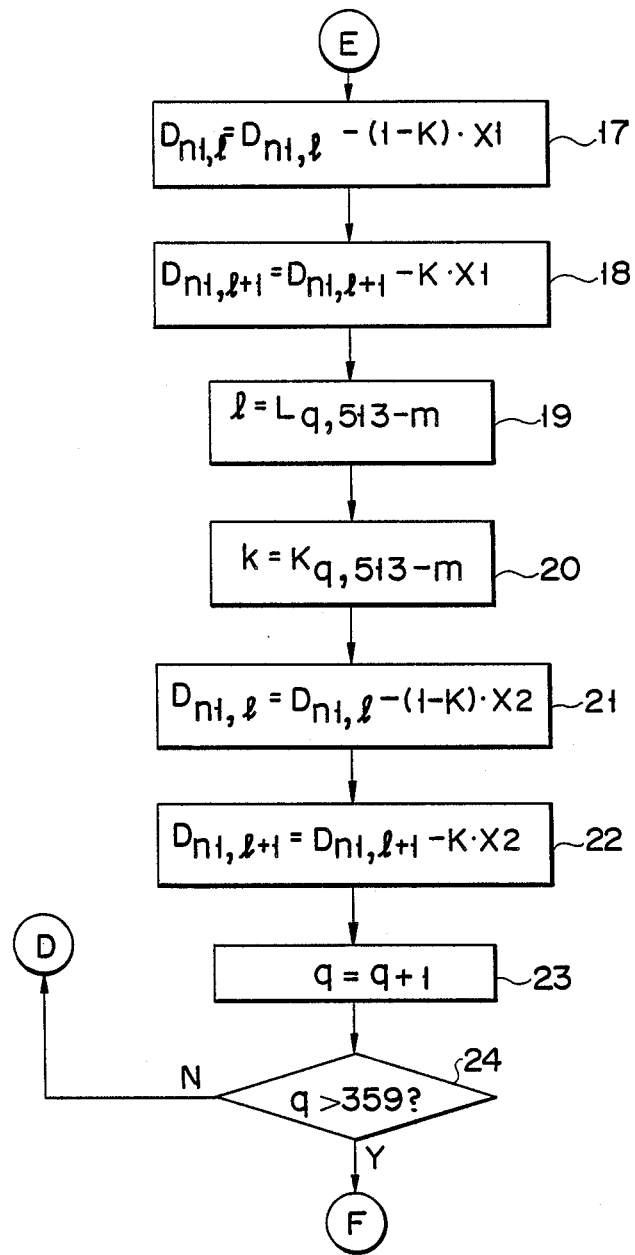

When the X-ray tube is rotated through as shown in FIG. 9, angle $\beta_m$ between the beam path passing through the same point as point E in FIG. 8 and the beam path connecting the focus F to the center O is given by $$\beta_m = \tan^{-1} \frac{\sin \alpha_m \times \cos(\theta - \alpha_m)}{1 + \sin \alpha_m \times \sin(\theta - \alpha_m)} \quad (4)$$

The number $m_l$ of the detecting position receiving the beam passing through the point E is given by substituting $\beta_m$ and $m_l$ into $\alpha_m$ and m in equation (3), respectively, and rearranging equation (3) as follows:

$$m_l = \beta_m/a + 257 - 0.5 \quad (5)$$

Since a fan beam is used $m_l$ does not necessarily become an integer. Thus, with an integer part taken as L and a fraction part as K, $m_l$ is given by $$m_l = L + K \quad (6)$$

If it is assumed that the data outside the m-th detecting positions are all removed from the sinogram and the m-th detecting position is the outermost detecting position, it is possible to remove the object detected by the $m_l$-th detecting position of the angle $\theta_i$ by subtracting the data detected by the m-th detecting position of the angle $\theta_i$ from the data detected by the $m_l$-th detecting position of the angle $\theta_i + \theta$ and by varying $\theta$ from 1° to 359°. By varying $\theta_i$ from 1° to 360°, the data for the portion inside the $m_l$-th detecting position is left. The calculation of $m_l$ is time-consuming. Thus, it is desired that $m_l$ be previously calculated and left in a table form.

The following indexes are used in calculating $m_l$. First, the index q, which represents the difference between the angle of the data to be subtracted and the projection angle, is found by dividing the rotation angle $\theta = 1°$ to 359° of the X-ray tube with a projection angular step. As described above, the projection angular step is 1° so that $\theta = q$. Thus, q changes from 1 to 359 in steps of 1. In addition to the projection angle index q, the detecting position number m is used as index. $L_{q,m}$ and $K_{q,m}$ in equation (6) are in advance calculated. These are shown in tables 2 and 3.

TABLE 2

| $L_{1,1}$ | $L_{1,2}$ | $L_{1,3}$ | ... | $L_{1,512}$ |
|---|---|---|---|---|
| $L_{2,1}$ | $L_{2,2}$ | $L_{2,3}$ | ... | $L_{2,512}$ |
| . | . | . | | . |
| . | . | . | | . |
| . | . | . | | . |
| $L_{359,1}$ | $L_{359,2}$ | $L_{359,3}$ | ... | $L_{359,512}$ |

TABLE 3

| $K_{1,1}$ | $K_{1,2}$ | $K_{1,3}$ | ... | $K_{1,512}$ |
|---|---|---|---|---|
| $K_{2,1}$ | $K_{2,2}$ | $K_{2,3}$ | ... | $K_{2,512}$ |
| . | . | . | | . |
| . | . | . | | . |
| . | . | . | | . |
| $K_{359,1}$ | $K_{359,2}$ | $K_{359,3}$ | ... | $K_{359,512}$ |

Next, the operations of the embodiment using these tables will be described with reference to the flowchart of FIGS. 10A through 10D.

Upon start of the operation a radius r1 is entered which represents the radius of a portion to be stereoscopically displayed, in step 1. That is, only the image in the cylinder of radius r1 is left for stereoscopic display. The step 1 is performed on an interactive basis.

In step 2, an opening angle $\alpha = \sin^{-1} r1/R$ between the circumference of the circle of radius r1 and the center of the circle as viewed from the X-ray tube is calculated.

In step 3, the detecting position $mm = 256.5 - \alpha/a$ is calculated for the opening angle $\alpha$, a is an angular step of the beam path of the fan beam as described above. Where obtained mm is a decimal it is rounded to an integer. By removing data obtained at detecting positions from 1 to mm, and data obtained at detecting positions from 512 to (513 - mm) the projection data for the outside of radius r1 can be removed.

The projection data stored in memory 4 is written into process data memory 6 in step 4. $D_{m,n}$ stands for the data stored in process data memory 6.

In steps 5 and 6, m and n are set such that $m = 1$, $n = 1$ in order to subtract the first projection data obtained at detecting positions 1 and 512 from the sinogram.

In steps 7 and 8, the data $D_{n,m}$ ($=D_{1,1}$) and $D_{n,513-m}$ ($=D_{1,512}$) are read out of memory 6 as X1 and X2, respectively. In this case, the read addresses are given by equation (1).

In steps 9 and 10, the data $D_{n,m}$ and $D_{n,513-m}$ in memory 6 are set at 0.

In step 11 the index q for projection angle is set at 1.

In step 12 nl is set at n+q.

In step 13 it is decided as to whether nl is above 360. When nl is above 360, nl−360 is newly used for nl in step 14 to return nl back to below or equal to 360. Following step 14, step 15 is executed.

In step 13, when nl is decided to be below or equal to 360 step 15 is executed immediately.

In step 15, with q and m taken as indexes an integer value l ($=L_{q,m}$) of the detecting position number receiving a beam is obtained from table 2.

In step 16, a fractional value k ($=K_{q,m}$) of the detecting position number is obtained from table 3 taking q and m as indexes.

In steps 17 and 18 data for unwanted portions is subtracted from the projection data. More specifically, since the number of the detecting position receiving a beam includes a fractional value the data X1 to be removed which has been obtained in step 7 is divided into two parts according to the fractional value k of the detecting position. These two parts are subtracted from the data at the 1-th and l+1-th detecting positions. That is, the data $D_{n1,l}$ and $D_{n1,l+1}$ are read out of memory 6, and $D_{n1,l}-(1-K).X1$ and $D_{n1,l+1}-K.X1$ are used for $D_{n1,l}$ and $D_{n1,l+1}$, respectively. Consequently, the data pertaining to one point at the outermost portions on the left of the horizontal center line is removed.

Similarly, in order to remove data pertaining to one point at the outermost portions on the right of the horizontal center line, an integer value l ($=L_{q,513-m}$) of the detecting position receiving a beam is obtained from table 2 with q and 513-m taken as indexes in step 19.

In step 20, a fractional value k ($=K_{q,513-m}$) of the detecting position number is obtained from table 3 with q and 513-m taken as indexes.

In steps 21 and 22, the data X2 to be removed which has been obtained in step 8 is subtracted from the data $D_{n1,l}$ and $D_{n1,l+1}$. That is, the data $D_{n1,l}$ and $D_{n1,l+1}$ are read out of memory 6, and $D_{n1,l}-(1-K).X2$ and $D_{n1,l+1}-K.X2$ are used for $D_{n1,l}$ and $D_{n1,l+1}$, respectively.

In step 23, q is incremented by 1.

In step 24, a decision is made as to whether q is above 359. When q is decided to be below or equal to 359 the steps are again executed from step 12.

When q is decided to be above 359 in step 24 n is incremented by 1 in step 25.

In step 26 a decision is made as to whether n is above 360. When n is below or equal to 360 the steps are again executed from step 11.

When n is decided to be above 360 in step 26 m is incremented by 1 in step 27.

In step 28 a decision is made as to whether m is above mm. When m is below or equal to mm the steps are again executed from step 6.

When m is above mm in step 28 the operation is completed.

As will be understood from the foregoing, the processed data stored in data memory 6 includes no data for the portions outside of radius rl but the projection data within the circle of radius rl. The projection data will provide a stereoscopic image free of unwanted portions which would adversely affect the stereoscopic presentation of an desired portion.

As described above, by obtaining a difference between stereoscopic images of two cylinders of different radii a stereoscopic image of a hollow cylinder shape can be obtained as well. Further, where a predetermined projection angle other than 360 is selected as a decision criterion in step 26 a stereoscopic image of a sector cylinder shape will be obtained. Similarly, by selecting a radius and an angle appropriately a stereoscopic image of a circular-arc cylinder shape will be obtained.

What is claimed is:

1. A stereoscopic display apparatus for use with a CT scanner for irradiating a slice of an object with a beam having uniformly spaced beam paths, at each of projection angles, and detecting the beam transmitted through the object in each beam path to provide projection data, said apparatus comprising:

memory means for storing the projection data of a plurality of slices output from said scanner for each of beam paths in each of projection angles;

subtracting means for subtracting predetermined projection data from data of every predetermined projection angles, among all data collected by the CT scanner and subtracting data other than data of the portion including the center of the slice by changing the predetermined projection data sequentially from the outermost projection data toward an inner data; and means responsive to the projection data of a plurality of slices output from said subtracting means for displaying a stereoscopic image.

2. An apparatus according to claim 1, wherein said memory means stores the projection data of the slices from said CT scanner in a form of sinogram; and said subtracting means subtracts data corresponding to beam paths outside a beam path passing through a point on a circumference of a predetermined radius in the object from each data of said sinogram.

3. An apparatus according to claim 2, wherein said subtracting means subtracts said data from said each data of said sinogram in all the projection angles.

4. An apparatus according to claim 2, wherein said CT scanner irradiates the object with a fan beam; said subtracting means subtracts from projection data of each slice stored in said memory means projection data corresponding to the first through the mm-th beam paths and projection data corresponding to the MM-th through the (MM+1-mm)-th beam paths where MM is the total number of the beam paths, mm=(MM+1)/2−α, α=$\sin^{-1}$ r1/R, r1 is the predetermined radius, and R is a distance between the center of the object and a source of beams.

5. An apparatus according to claim 1, wherein said memory means stores the projection data of a plurality of slices from said scanner in the form of sinogram; and said subtracting means subtracts data corresponding to the beam paths outside a beam path passing through a point on a circumference of a first radius in the object from each data of said sinogram to obtain first data, subtracts data corresponding to the beam paths outside a beam path passing through a point on a circumference of a second radius smaller than the first radius from each data of the sinogram to obtain second data, and subtracts the second data from the first data.

6. An apparatus according to claim 5, wherein said subtracting means obtains the fist and second data and subtracts the second data from the first data in all the projection angles.

7. A method for displaying a stereoscopic image using a CT scanner comprising the steps of:

a first step of collecting projection data from said CT scanner in each of projection angles, the projection data comprising a plurality of items of data corresponding to a plurality of uniformly spaced projection beam paths;

a second step of subtracting data corresponding to predetermined projection beam path for a predetermined projection angle from the data collected;

a third step of performing said second step again after changing the predetermined projection angle as to the subtraction data by a predetermined angle;

a fourth step of performing said second and third steps again after changing the predetermined projection beam path as to the subtraction data by one so that data corresponding to beam paths other than predetermined beam paths existing at the center portion is subtracted from the data collected;

a fifth step of performing said first through fourth steps for projection data of a plurality of slices to form display data comprising data corresponding to predetermined projection beams existing at the center portion of the projection data of the plural slices; and a sixth step of performing a stereoscopically visible display on the basis of the display data obtained in said fifth step.

8. A method according to claim 7, wherein
said first step collects the projection data from said CT scanner for each of projection beam paths in each of projection angles to form a sinograph.

9. A method according to claim 7, wherein
said second step performs the subtraction sequentially from the data corresponding to the outermost beam path.

10. A method according to claim 7, wherein
said sixth step performs the stereoscopically visible display on the basis of a stereoscopic display method using projection images.

* * * * *